(12) United States Patent
Bentz (10) Patent No.: US 7,057,623 B1
(45) Date of Patent: Jun. 6, 2006

(54) TEXTURE ADDRESSING CIRCUIT AND METHOD

(75) Inventor: Ole Bentz, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 246 days.

(21) Appl. No.: 09/715,428

(22) Filed: Nov. 15, 2000

(51) Int. Cl.
*G09G 5/00* (2006.01)

(52) U.S. Cl. ..................................... 345/582

(58) Field of Classification Search ............... 345/582, 345/587, 482
See application file for complete search history.

(56) References Cited

U.S. PATENT DOCUMENTS

| | | | | |
|---|---|---|---|---|
| 5,230,039 A * | 7/1993 | Grossman et al. | ........... | 345/582 |
| 6,295,070 B1 * | 9/2001 | Wood | ........................... | 345/582 |
| 6,366,290 B1 * | 4/2002 | Dye et al. | .................... | 345/582 |
| 6,417,860 B1 * | 7/2002 | Migdal et al. | .............. | 345/582 |
| 6,429,873 B1 * | 8/2002 | Kacevas et al. | ............ | 345/587 |
| 6,452,603 B1 * | 9/2002 | Dignam | ...................... | 345/582 |
| 6,501,482 B1 * | 12/2002 | Rosman et al. | ............. | 345/587 |

* cited by examiner

*Primary Examiner*—Jeffery Brier
*Assistant Examiner*—Jin-Cheng Wang
(74) *Attorney, Agent, or Firm*—Dorsey & Whitney LLP (57) ABSTRACT

A texture addressing circuit and method for calculating texture coordinates according to various texture addressing modes for texture maps having arbitrary sizes. Texture coordinates are calculated from input texture coordinate values the texture addressing circuit receives and that are located in one of a plurality of predefined input ranges. The texture addressing circuit includes a plurality of coordinate calculation circuits to calculate coordinate output values for each of the input coordinate ranges and to provide the values to a selection circuit from which an output texture coordinate is selected. An output texture coordinate is selected based on the sign of the input texture coordinate and the sign of the calculated texture coordinate values.

18 Claims, 6 Drawing Sheets

TEXTURE ADDRESSING CIRCUIT AND METHOD

TECHNICAL FIELD

The present invention is related generally to the field of computer graphics, and more particularly, to a texture addressing method and circuit for a computer graphics processing system.

BACKGROUND OF THE INVENTION

In graphics image processing systems, application of texture maps to the surfaces of graphics primitives are used to create the appearance of texture on a rendered graphics image. Texture maps are typically graphics images composed of "texels" that are arranged in a rectangular coordinate system. Thus, a texture map has an associated width and height. In applying the texture map to the surface of a graphics primitive, the texel coordinates of texels that are needed to calculate the color value of a pixel in a rendered graphics image are identified, and the color data associated with the identified texels are retrieved from memory. The color value of the pixel is then calculated from the retrieved color values using one of various well-known techniques. Consequently, when a texture map is applied to the surface, the surface adopts the characteristics of the texture, such that the coloring for the surface is derived from the texture. The applied texture map results in a realistic texture appearance in the rendered graphics image.

When calculating the texel coordinates for the texels that should be retrieved to calculate the color value of the pixel in the graphics image, the calculated texel coordinates may fall outside of the coordinate range of the texture map. Several different texture addressing modes have been developed to deal with this situation. For example, a "repeat" addressing mode causes a texture to be repeated as it is applied onto a graphics primitive. A "mirror" addressing mode causes a texture to be repeated such that every other repetition is a mirrored version of the original texture. The previous two addressing modes have the advantage of allowing a relatively small texture map to be applied repetitively to cover a larger surface of a graphics image. Consequently, less data needs to be stored in memory for the application of a texture over a large surface.

Additional addressing modes include a "clamp-to-edge" addressing mode that fixes the texel coordinate to that of the texel at the edge of the texture map when the calculated texel address is beyond the range of the texture map. Thus, the color value of the edge texel is used as the color value for the pixel. A "clamp-to-border" addressing mode fixes the texel coordinate to one texel beyond the border of the texture map. A border color is assigned to the texels beyond the edge of the texture map, resulting in a pixel having a color value of the border color. Another addressing mode is the "clamp-to-half-edge and half-border" addressing mode, where the texel address is clamped to one-half a texel beyond the edge of the texture map, yielding a color value for the pixel that is the combination of the color value of the edge texel and a border color.

Application of the various addressing modes is a relatively simple operation where a texture map has a width and height that are powers of two. In this case, application of masks based on logical AND gates are typically used to generate appropriate texel coordinates from the input coordinate values when requesting graphics data for a texel located outside the range of the texture map. However, where the texture map does not have dimensions that are a power of two, that is to say the texture map has an arbitrary size, several comparators and additional selection circuitry are required to carry out the various addressing modes. The additional circuitry adds complexity to the overall graphics processing system and consumes additional space where the graphics processing system is integrated into a single device.

Exacerbating the problem is the fact that during texture processing, addressing mode operations may need to be performed in combination with the application of one or more advanced graphics algorithms, such as bump mapping, anisotropic filtering, and mipmapping. Consequently, the problems associated with circuit complexity and size are compounded where several graphics algorithms are performed during texture processing. As a result, the complexity and size of the overall graphics processing system may dramatically increase in order to accommodate various addressing modes for arbitrary sized texture maps.

SUMMARY OF THE INVENTION

The present invention relates to a method and system for calculating texture coordinates according to various texture addressing modes for texture maps having arbitrary sizes. The texture coordinates are calculated from input texture coordinate values located in one of a plurality of predefined input ranges. A plurality of texture coordinate values corresponding to the plurality of predefined input coordinate ranges are calculated in accordance with the sign of the input coordinate values, and from the calculated texture coordinate values, an output texture coordinate is selected based on the sign of the input texture coordinate and the sign of the calculated texture coordinate values. A texture addressing circuit for calculating texture coordinates includes a plurality of coordinate calculation circuits corresponding to the plurality of input coordinate ranges and a selection circuit that is coupled to receive as input values the input coordinate and the coordinate output values of the plurality of coordinate calculation circuits. Select logic coupled to the selection circuit provides a selection signal commanding the selection circuit to select one of the input values as the output texture coordinate according to input signals corresponding to the sign of the input coordinate value and the signs of the coordinate output values.

DETAILED DESCRIPTION OF THE INVENTION

Embodiments of the present invention provide methods and texture coordinate circuits that implement various texture addressing modes for texture maps having arbitrary sizes, as well as for those having dimensions that are powers of two. The circuits and methods may be adapted to different ranges of input and output values, and consequently, may be used at various stages of a texture processing operation. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
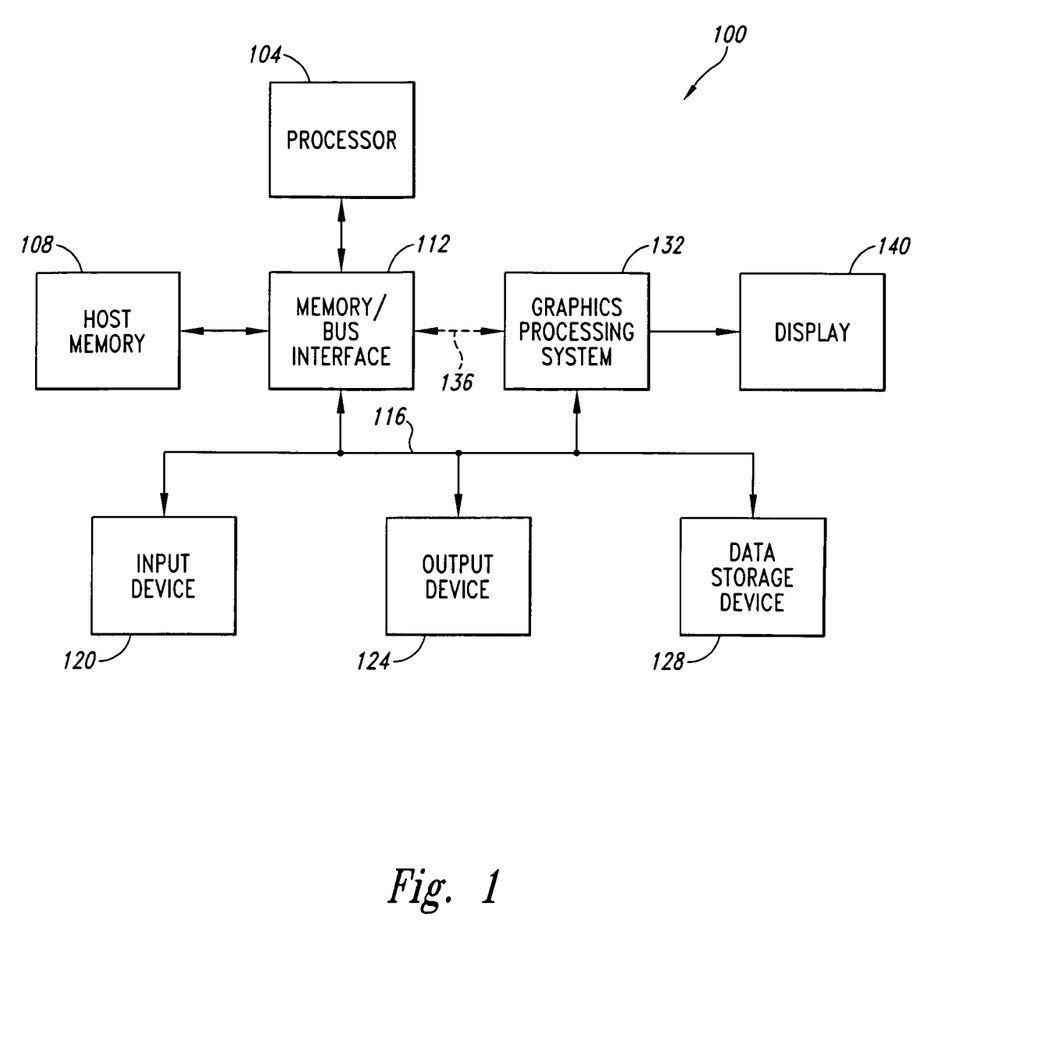
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
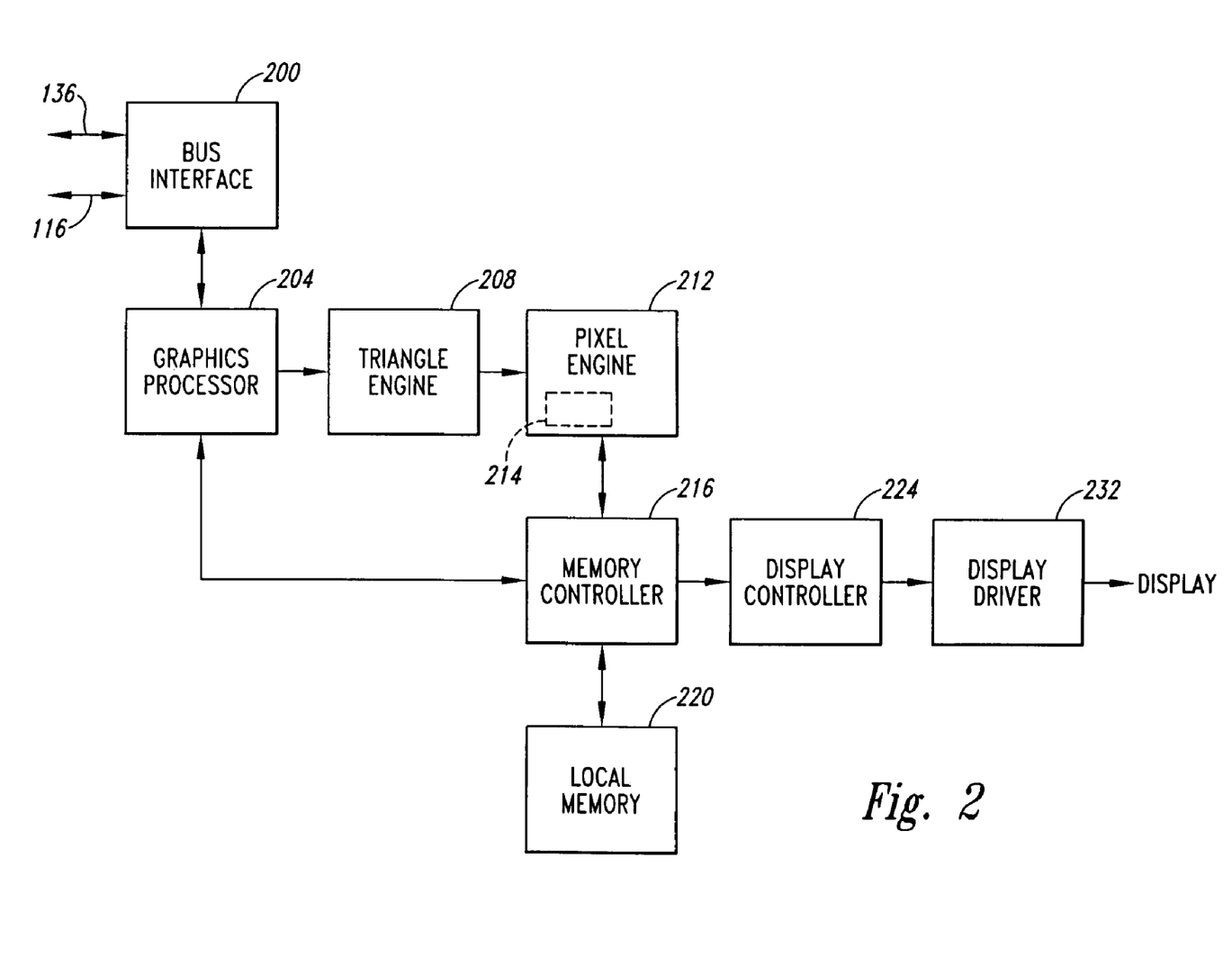
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, and rendering of graphics primitives.

A pixel engine 212 is coupled to receive the graphics data generated by the triangle engine 208. The pixel engine 212 contains circuitry for performing various graphics functions, such as, but not limited to, calculating texel coordinates of a texture map, texture application or mapping, bilinear filtering, fog, blending, and color space conversion. The graphics functions are performed by a pixel processing pipeline 214 that is included in the pixel engine 212. As will be explained in more detail below, calculation of the texel coordinates at various stages of the pixel pipeline 214 during texture processing may yield texel coordinates that are located outside of the coordinate range of the texture map being applied. The calculated coordinates are then remapped to corresponding coordinates located within the coordinate range of the texel map according to one of the previously described addressing modes to produce the desired texture effect.

A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. The destination color values are subsequently provided to a display driver 232 that includes circuitry to provide digital color signals, or convert digital color signals to red, green, and blue analog color signals, to drive the display 140 (FIG. 1).

Figure 3:
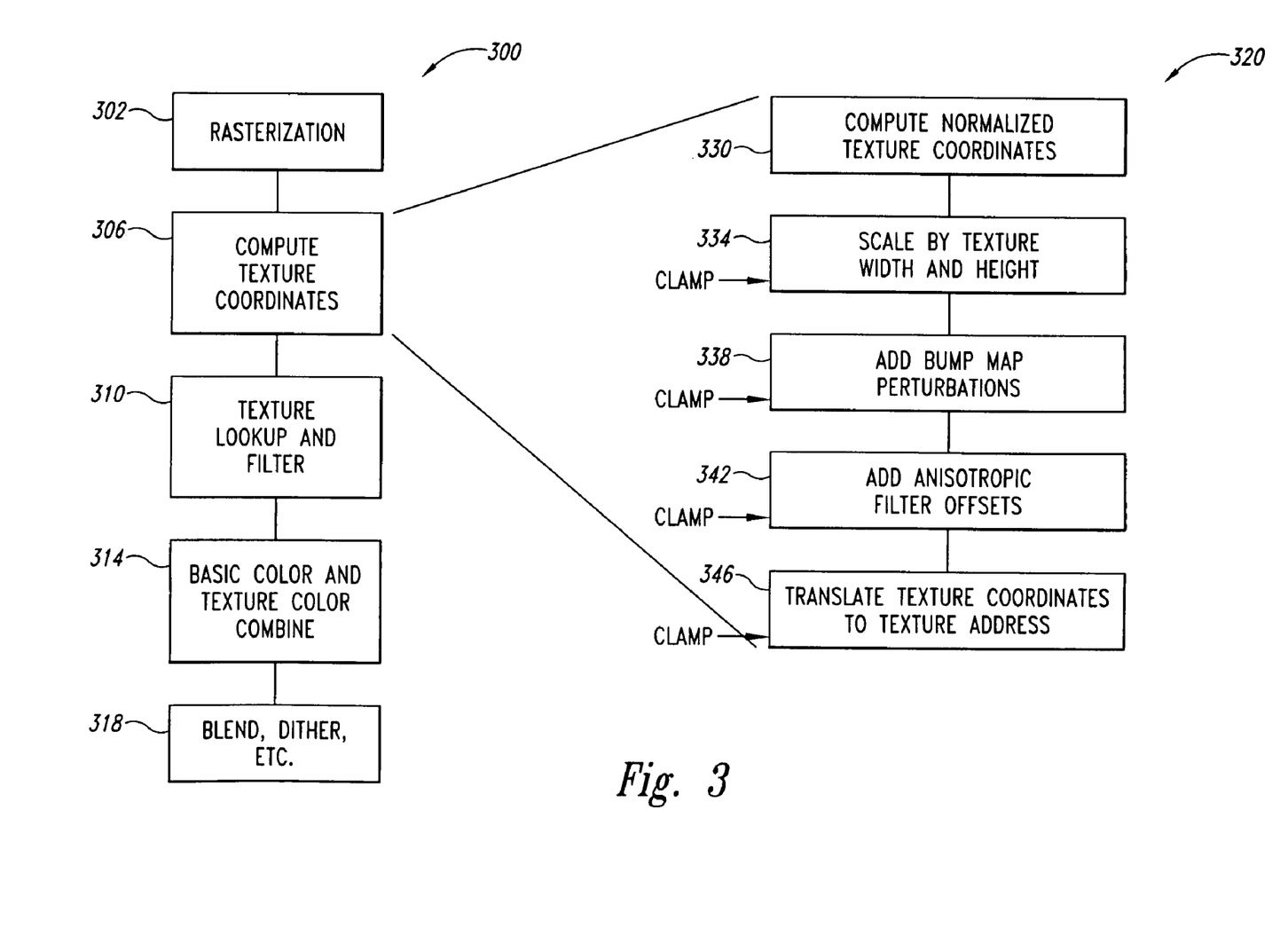
FIG. 3 is a flow diagram of a 3D graphics processing pipeline.

FIG. 3 illustrates a flow diagram 300 of a generic 3D graphics processing pipeline, portions of which are included in the triangle and pixel engines 208 and 212. Following rasterization of the graphics primitives at 302, coordinates of texels needed for the application of a texture map are calculated at 306. The computation of texture coordinates at step 306 is shown in greater detail in flow diagram 320. Initially, the normalized texel coordinates are computed for the desired texels and are then scaled by the width and height of the texture map in which the texels are located. Normalized texel coordinates correspond to the relative position of a texel in a texture map having dimensions between 0 and 1. That is, the width or the height of a texture map is represented over a range of [0:1[ (i.e., a range greater than or equal to zero, but less than 1). The normalized coordinates are scaled by multiplying the normalized texel coordinates by the dimensions of the texture map so that the width and height are represented over a range of $[0:\text{tex\_size}_{width}[$ and $[0:\text{tex\_size}_{height}[$, respectively.

The scaled coordinates are then modified at 338 by applying bump map algorithms to create the appearance of additional texture in the form of small surface perturbations. Anisotropic filter offsets are added to the modified texel coordinates at 342 to improve image quality of the textured surface, and at 346 the resulting texel coordinates are translated into texture addresses corresponding to the memory locations at which the color values for the resulting texel coordinates are stored. It will be appreciated that the computation of texel coordinates, and the scaling, bump mapping, filtering and translating operations, are all well understood in the art, and as such, detailed explanation of the steps may be omitted from herein.

As illustrated in FIG. 3, several of the resulting values from the various stages in the computation of texel coordinates may need to be clamped (i.e., limited to a predetermined range of values) before proceeding to the next operation. For example, the scaled texel coordinates may need to be clamped prior to the bump mapping operation 338. Similarly, the modified coordinates from the bump mapping operation 338 may need to be clamped, as well as the coordinates after anisotropic filter offsets have been added 342 and while the final texture address is being computed 346. As previously discussed, because of the multiple clamping operations that are performed during the texel coordinate computation, a relatively simple and area efficient clamp circuit and clamping method are desirable.

The clamping requirements are determined by the chosen architecture, the choice of implementation, and the numerical representation used (e.g., integer, fixed-point, signed data, etc.). Clamping can be deferred by increasing the number of bits used in an integer or fixed-point datapath, but this incurs higher hardware costs that need to be considered in a trade-off with the cost of clamping. Embodiments of the present invention are not partial to the choice of where to clamp, but rather provides a method by which clamping can be done where necessary, and it can be designed to enable clamping over a given range to enable the combination of deferred clamps.

Figure 4A:
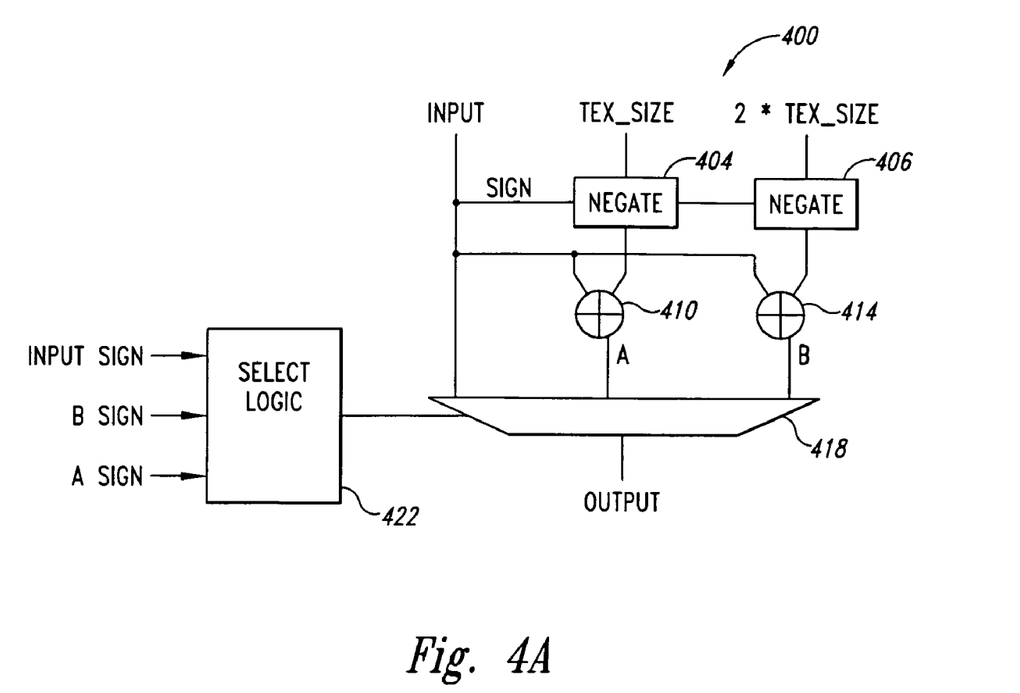
FIGS. 4a–b are schematic diagrams of a texture coordinate circuit according to an embodiment of the present invention.

FIG. 4a illustrates a texture coordinate circuit 400 according to an embodiment of the present invention. The texture coordinate circuit 400 implements the repeat addressing mode. As mentioned previously, in a repeat addressing mode the texture map is applied repetitively across a surface when the texture map is not large enough to span the entire surface. Thus, texel coordinates for texels located outside of the range of the texture map are used to calculate corresponding texels located in the texture map so that the image of the texture map is repeated. It will be appreciated that one texture coordinate circuit 400 is used for each axis of the texture map. Thus, two texture coordinate circuits are operated in parallel to determine the appropriate output coordinate for a texture having two dimensions.

The texture coordinate circuit 400 determines the appropriate output texel coordinate by performing the following decision operation:

```
if (input < 0)
    if (A < 0)
        output = B
    else
        output = A
else
    if (A < 0)
        output = input
    else if (B < 0)
        output = A
    else
        output = B
``` where

```
if (input < 0)
    A = input + (1 * tex_size)
    B = input + (2 * tex_size)
else
    A = input - (1 * tex_size)
    B = input - (2 * tex_size)
``` where input is the input texel coordinate (along one axis), output is the output coordinate adjusted according to the repeat mode (along the one axis), and tex_size is the dimension of the texture map in texels along the axis corresponding to the input coordinate. Although the range of input values in the present example are limited to the range of ]−2.0:3:0[*tex_size, it will be appreciated that the texture coordinate circuit 400 may be adapted to accommodate a greater range of input values.

Figure 4B:
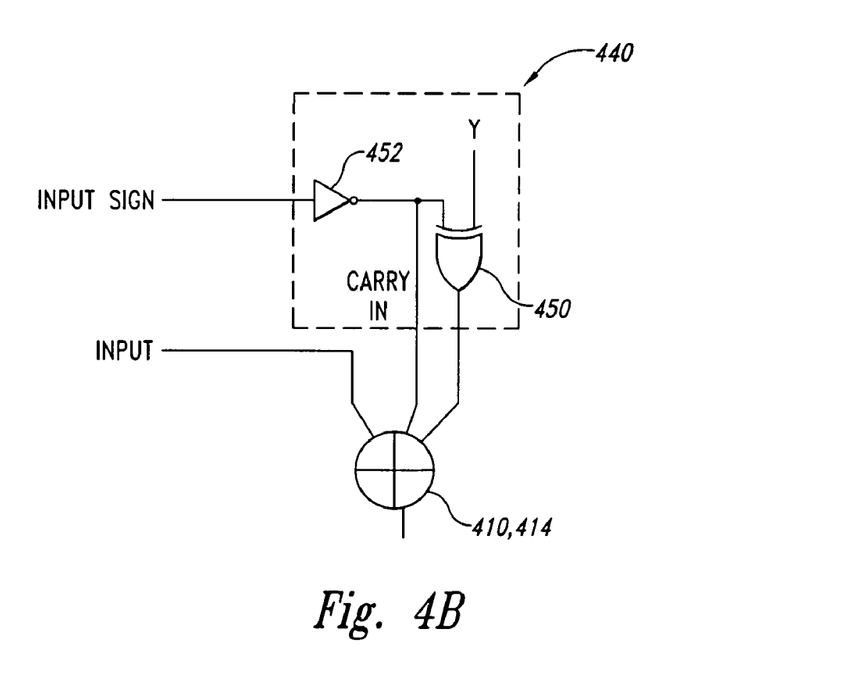

The texture coordinate circuit 400 includes a multiplexer 418 receiving three input values: (1) the input texel coordinate; (2) the calculated A value; and (3) the calculated B value. The selection of which input value to provide as an output coordinate is made by the select logic 422. The select logic provides the signals to select the appropriate value based on the sign of the input coordinate, calculated A, and calculated B values. The calculated A value provided to the multiplexer 418 is the output of adder circuit 410, which sums the input coordinate value and the output of negate circuit 404. The negate circuit 404 determines whether the tex_size value should be added to or subtracted from the input coordinate value based on the sign of the input value. When the input is a positive value, the negate circuit 404 is set to provide a negative tex_size value. The calculated B value is determined similarly to the A value. That is, negate circuit 406 determines whether (2*tex_size) should be added to or subtracted from the input value based on the sign of the input value. The resulting sum is provided to the multiplexer 418 by adder circuit 414. FIG. 4b illustrates a negate circuit 440 that may be substituted for the negate circuits 404 and 406 of the texture coordinate circuit 400. The negate circuit 440 includes an exclusive OR (XOR) logic gate 450 and an inverter 452 to accommodate a carry in bit and provide the XOR gate 450 with the inverted value of the sign of the input coordinates.

It will be appreciated that the following example is provided to describe the operation of the texture coordinate circuit 400 and should not be interpreted as limiting the scope of the present invention. In operation, an input texel coordinate is provided to the texture coordinate circuit 400. If the value is outside the range of the tex_size for the texture map, a coordinate corresponding to a location within the texture map is calculated and used to retrieve the graphics data associated with the calculated coordinate. The result is that the image of the texture map appears to be repeated across the surface of a graphics image. For example, an input value of (−1.3*tex_size) is provided to the texture coordinate circuit 400. The negative sign of the input coordinate value sets the negate circuits 404 and 406 to provide (+tex_size) and (+2*tex_size) to the adder circuits 410 and 414, respectively. Consequently, the three values provided to the multiplexer are input=(−1.3*tex_size), A=(−0.3*tex_size), and B=(0.7* tex_size). In accordance with the decision operation previously described, the selection of which of these values to provide as an output value is made by the select logic 422 based on the negative sign of the input value, the positive sign of the B value, and the negative sign of the A value. As a result, the multiplexer selects the B value as the output value. Thus, for the input texture coordinate of (−1.3*tex_size), the coordinate value of (0.7*tex_size) is used to retrieve the corresponding graphics data.

The result of (0.7*tex_size) is consistent with a qualitative explanation of the repeat texture addressing mode. For a texture map to appear to be repeated across the surface of a graphics image, the color value of a texel in the texture map should be repeated for texels located outside of the texture map that have the same relative coordinate position. That is, for a repeat addressing mode, the graphics data associated with the texel coordinate (0*tex_size) should correspond to texel coordinates (−2* tex_size), (−1*tex_size), (1*tex_size), and (2*tex_size). Similarly, the graphics data associated with the texel (0.2*tex_size) should correspond to texel coordinates (−1.8* tex_size), (−0.8*tex_size), (1.2*tex_size), and (2.2*tex_size). Applying this same logic to the texel coordinate (−1.3*tex_size), the corresponding texel coordinate that is located in the texture map is (0.7*tex_size), which is the same result produced in the previous example by the texture coordinate circuit 400.

Figure 5:
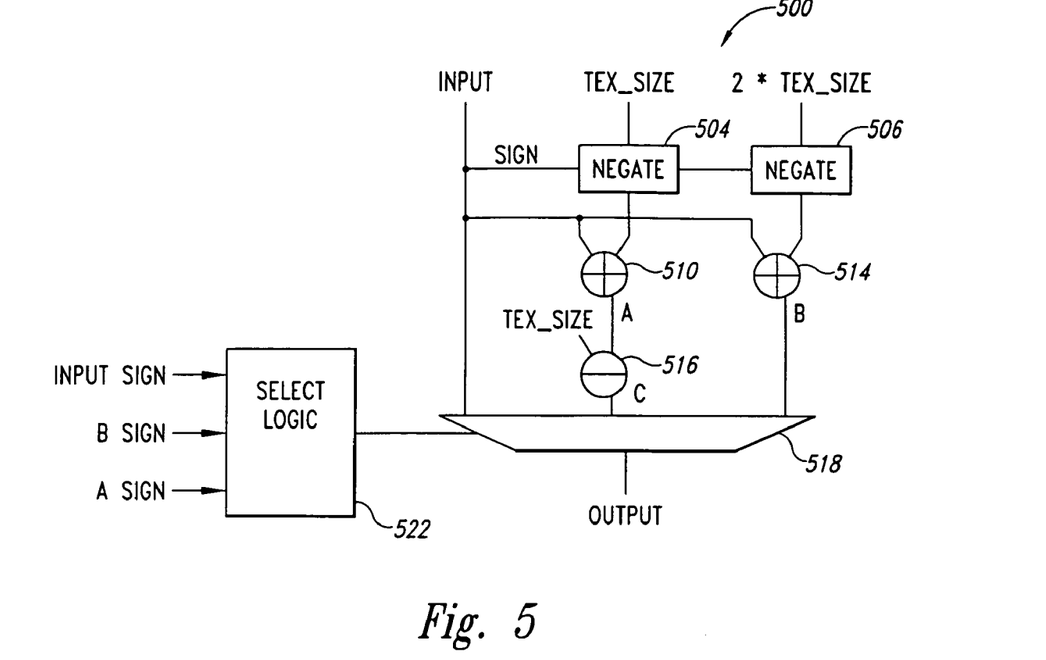
FIG. 5 is a schematic diagram of a texture coordinate circuit according to another embodiment of the present invention.

FIG. 5 illustrates a texture coordinate circuit 500 according to another embodiment of the present invention. The texture coordinate circuit 500 implements the mirror addressing mode previously discussed. In a mirror addressing mode, the texture map is applied repetitively across a surface when the texture map is not large enough to span its entirety, as with the repeat texture addressing mode. However, each texture map applied across the surface is the mirror image of preceding texture map image. Thus, every other application of the texture map across the surface has the same orientation, that is, either the orientation of the original texture map, or its mirror image.

The texture coordinate circuit 500 determines the appropriate output texel coordinate by performing the following decision operation:

```
if (input < 0)
    if (A < 0)
        output = B
    else
        output = C
else
    if (A < 0)
        output = input
    else if (B < 0)
        output = C
    else
        output = B
``` where

```
if (input < 0)
    A = input + 1 * tex_size
    B = input + 2 * tex_size
else
    A = input − 1 * tex_size
    B = input − 2 * tex_size
also C = tex_size − A
```

As with the texture coordinate circuit 400 (FIG. 4), the texture coordinate circuit may be adapted to accommodate input ranges other than ]−2.0:3.0[*tex_size.

The texture coordinate circuit 500 includes a multiplexer 518 receiving three input values: (1) the input texel coordinate; (2) the calculated C value; and (3) the calculated B value. The selection of which input value to provide as an output coordinate is made by the select logic 522. The select logic 522 provides the signals to select the appropriate value based on the sign of the input coordinate, the calculated A value, and the calculated B value. The calculated C value provided to the multiplexer 518 is the output of a subtraction circuit 516, which subtracts the calculated A value from the tex_size. The A value is calculated in the same fashion as described previously with respect to the texture coordinate circuit 400 (FIG. 4). Similarly, the B value is also calculated as previously described.

In operation, an input texel coordinate is provided to the texture coordinate circuit 500. If the value is outside the range of the tex_size for the texture map, a coordinate corresponding to a location within the texture map is calculated and used to retrieve the graphics data associated with the calculated coordinate in order to repeat mirror images of the texture map across a surface. For example, an input value of (−0.3*tex_size) is provided to the texture coordinate circuit 500. The negative sign of the input coordinate value sets the negate circuits 504 and 506 to provide (+tex_size) and (+2*tex_size) to the adder circuits 510 and 514, respectively. The calculated A value provided to the subtraction circuit 516 is (0.7*tex_size) and the B value is (1.7* tex_size). The A value is provided by the adder circuit 510 is subtracted from the tex_size value by the subtraction circuit 516 to yield a C value of (0.3*tex_size). The input value is negative, but the A value is positive, thus, according to the decision operation for the texture coordinate circuit 500, the select logic circuit 522 commands the multiplexer 518 to select the C value as the output value. As expected, for the input texture coordinate of (−0.3*tex_size), the output coordinate value of (0.3*tex_size) is used to retrieve the corresponding graphics data.

Figure 6:
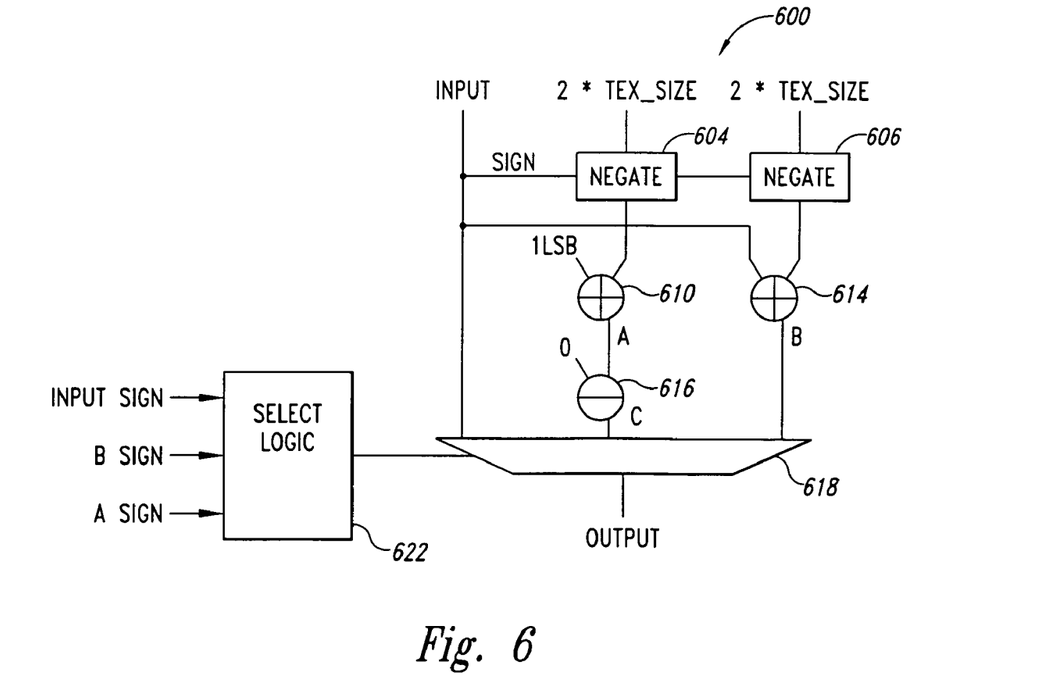
FIG. 6 is a schematic diagram of a texture coordinate circuit according to another embodiment of the present invention.

FIG. 6 illustrates a texture coordinate circuit 600 according to another embodiment of the present invention. The texture coordinate circuit 600 implements a coarse clamping operation for the various clamping addressing modes previously discussed. A problem arises with clamping when scaling normalized texture coordinates by arbitrary texture dimensions. This occurs when another common graphics algorithm "mipmapping" is employed along with "linear" texture filtering. In this case it is not adequate to clamp to exactly [0:tex_size−1], [−0.5:tex_size−0.5], or [−1.0:tex_size], for the clamp-to-edge, clamp-to-half-edge-half-border, or clamp-to-border cases respectively. In these cases it is more tractable to clamp in two (or more) stages. That is, first clamp coarsely to a range that is guaranteed to have the necessary range of values (e.g. [−2*tex_size:2*tex_size[), and secondly clamp to the exact required range after the mipmapping effects have been taken into consideration. The coarse clamp allows use of fixed point arithmetic and enables hardware implementations to use datapaths of moderate size. The detailed clamp just has to deal with data in the chosen range of values, and needs to perform the exact clamping only one time. Circuits implementing the detailed clamping operation of the different clamping modes are well known by those of ordinary skill in the art, and consequently, a detailed description of such conventional clamping circuits has been omitted from herein.

The texture coordinate circuit 600 determines the appropriate output texel coordinate by performing the following decision operation:

```
            if (B < 0)
                output = C
            else
                output = input
``` where

```
            if (input < 0)
                A = 2 * tex_size
                B = input + 2 * tex_size
            else
                A = -2 * tex_size + 1 LSB
                B = input - 2 * tex_size
            also C = 0 - A
``` where 1 LSB refers to 1 "Least Significant Bit" (i.e. the constant 000 . . . 001) in the number representation chosen for the implementation. This allows for integer datapaths as well as fixed point datapaths (where some number of bits represents fractions instead of whole numbers). Although the range of input values for texture coordinate circuit 600 as presently described is limited to ]–3.0:4.0[*tex_size, the circuit may be adapted for other ranges of input values.

The texture coordinate circuit 600 includes a multiplexer 618 receiving three input values: (1) the input texel coordinate; (2) the calculated C value; and (3) the calculated B value. The selection of which input value to provide as an output coordinate is made by the select logic 622. The select logic 622 provides the signals to select the appropriate value based on the sign of the input coordinate, the calculated A value, and the calculated B value. The B value is calculated in the same fashion as described previously with respect to the texture coordinate circuit 400 (FIG. 4). The calculated C value provided to the multiplexer 618 is the output of a subtraction circuit 616, which subtracts the calculated A value from a zero value.

In operation, an input texel coordinate is provided to the texture coordinate circuit 600. If the input value is outside the range set for the coarse clamping operation, a coordinate corresponding to a location within the coarse clamping range is calculated prior to the detail clamping operation. As illustrated in FIG. 6, the output range is set for [–2.0:2.0[*tex_size. However, any range may be selected as long as the necessary range for the particular clamping mode is available. As mentioned previously, implementing a two step clamping operation allows the use of fixed point arithmetic for the coarse clamping and the option to perform detail clamping only one time.

Figure 7:
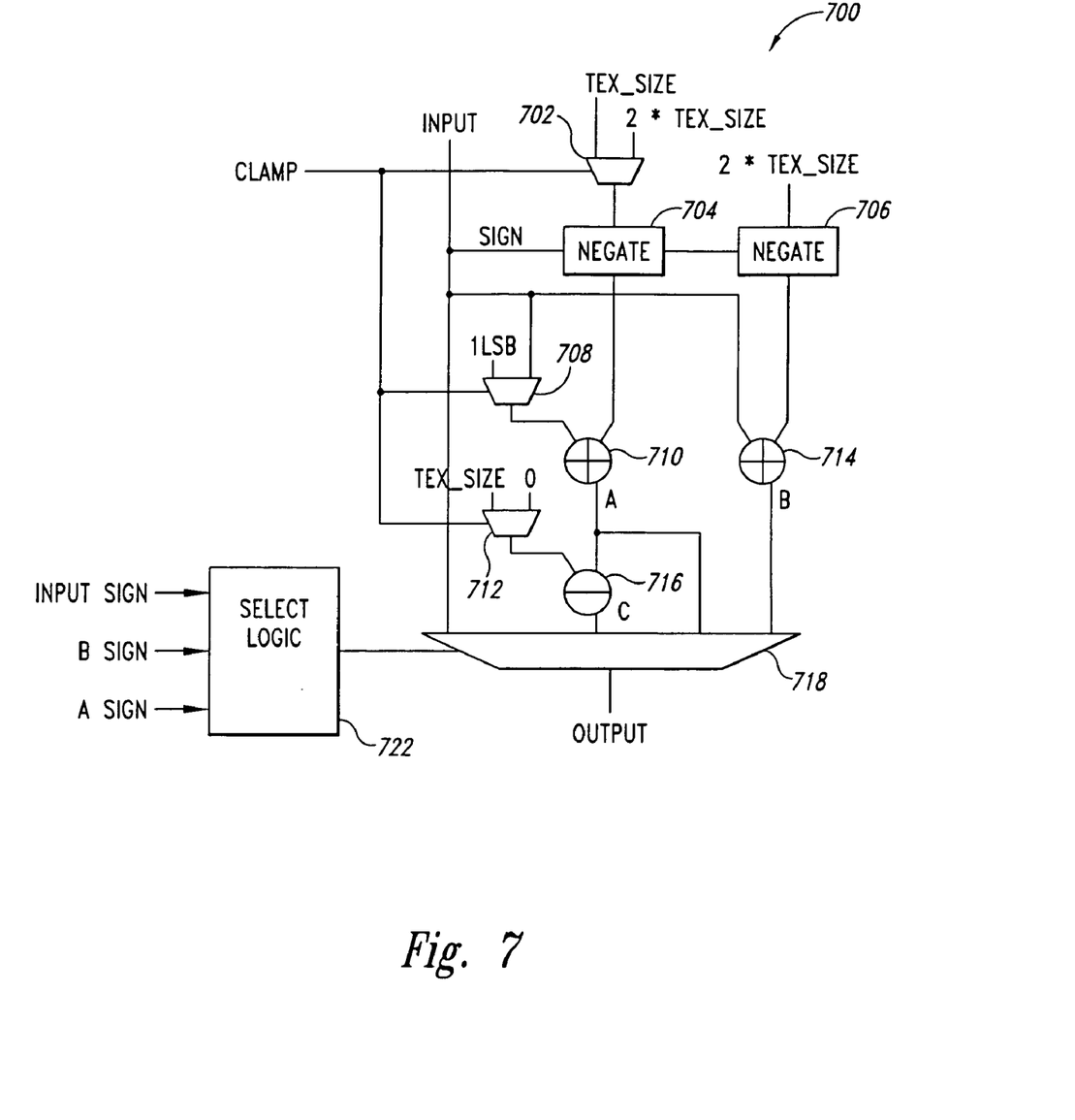
FIG. 7 is a schematic diagram of a texture coordinate circuit according to another embodiment of the present invention.

FIG. 7 illustrates a texture coordinate circuit 700 according to an embodiment of the present invention. The texture coordinate circuit 700 combines together the functionality of the previous texture coordinate circuits 400, 500, and 600, described with respect to FIGS. 4, 5, and 6, respectively. That is, the texture coordinate circuit 700 can accommodate the repeat, mirror, and clamping addressing modes.

The texture coordinate circuit 700 includes a multiplexer 718 receiving four input values: (1) the input texel coordinate; (2) the calculated C value; (3) the calculated A value; and (4) the calculated B value. The selection of which input value to provide as an output coordinate is made by the select logic 722 based on the texture addressing mode, the sign of the input coordinate, the calculated A value, and the calculated B value. The calculation of the A, B, and C values are as previously described with respect to texture coordinate circuits 400, 500, and 600. Multiplexers 702, 708, and 712 are included in the texture coordinate circuit 700 to provide the correct values to the negate circuit 704, the adder circuit 710, and the subtraction circuit 716, respectively, so that the different values used in the various texture addressing modes may be provided. Each of the multiplexers 702, 708, and 712 receive a CLAMP signal (which is asserted when the texture addressing mode is one of clamp to edge, clamp to border, or clamp to half-edge-half-border) to select the appropriate input values.

It will be appreciated that many of the circuit elements illustrated in FIGS. 4–7, such as adder circuits, multiplexers, negate circuits, and select logic, are conventional in operation and design. Implementation of these various circuits are well understood by those of ordinary skill in the art, and embodiments of the present invention may be practiced without detailed explanation of such circuits. Moreover, the scope of the present invention should not be limited by the particular implementation of these circuits, except to the extent the limitations are recited in the appended claims.

Although the previous examples describe operation over a range of input values of ]–2.0:3.0[*tex_size and output values of [0.0:1.0[*tex_size for the repeat and mirror modes, and a range of input values of ]–3.0:4.0[*tex_size and output values of [–2.0:2.0[*tex_size for the clamping modes, embodiments of the present invention may be adapted to different ranges of input values, and consequently, may be used at various stages of a texture processing operation. From the description provided herein, a person of ordinary skill in the art will understand the modifications that should be made in order to extend the range of input values beyond that previously described.

As mentioned previously, embodiments of the present invention accommodate the application of the various addressing modes for textures having arbitrary dimensions, as well as texture maps having dimensions that are a power of two. The complicated circuitry and relatively large circuit sizes of the conventional circuits and methods may be avoided using embodiments of the present invention in a graphics processing system.

From the foregoing it will be appreciated that, although specific embodiments of the invention have been described herein for purposes of illustration, various modifications may be made without deviating from the spirit and scope of the invention. For example, although the embodiments of the present invention have been described with respect to a circuit, the calculation of an output coordinate value corresponding to a texel located in the range of a texture map may be implemented to various degrees in software. The application of some or all of the principles described herein through software may be preferable to a hardware implementation where the appropriate circuitry does not exist in a graphics processing system, but implementation of the present invention is still desired. Additionally, in the previous discussions, a texture image has been referred to as having 2 dimensions. However, texture images can also have 3 dimensions, each dimension being orthogonal to the others. The present invention also applies to the $3^{rd}$ dimension in the same way it is applied to the first 2 dimensions. Accordingly, the invention is not limited except as by the appended

The invention claimed is:

1. A method of calculating a texture coordinate for a texture map having a size from an input texture coordinate value located in one of a plurality of predefined input ranges, comprising:
   calculating a plurality of signed texture coordinate values corresponding to the plurality of predefined input coordinate ranges, where the sign of the input texture coordinate value is negative, calculating a first value A=[input+(1*tex_size)] and a second value B=[input+(2*tex_size)], and otherwise, calculating a first value A=[input−(1*tex_size)] and a second value B=[input−(2*tex_size)], input is the input texture coordinate value and tex_size is the size of the texture map;
   concurrently receiving the plurality of signed texture coordinate values and the input texture coordinate value; and
   selecting an output texture coordinate from the plurality of calculated texture coordinate values and the input texture coordinate value, where the sign of the input texture coordinate value is negative, selecting B when (A<0), otherwise selecting A as the corresponding texture coordinate, and where the input texture coordinate value is equal to zero or the sign of the input texture coordinate is positive, selecting the input texture coordinate value when (A<0), selecting A when (B<0), and selecting B otherwise.

2. The method of claim 1 wherein calculating and selecting are repeated for each axis of the texture map.

3. A texture addressing circuit for calculating texture coordinates for a texture map having a size and an acceptable range of input coordinate values, the circuit comprising:
   a plurality of coordinate calculation circuits corresponding to a plurality of input coordinate ranges defined outside of the acceptable range for both negative and positive input coordinate values, each coordinate calculation circuit coupled to receive a signal corresponding to the sign of the input coordinate value and a respective texture size value corresponding to a multiple of the size of the texture map, each coordinate calculation circuit providing a respective signed coordinate output value calculated from the input texture coordinate value and the size of the texture map, a first and a second coordinate calculation circuit of the plurality including a negating circuit configured to generate an output value corresponding to a positive or negative respective texture size value in accordance with the sign of the input coordinate value, and further including a summing circuit having a first input coupled to negating circuit and a second input at which a second input value is provided, the summing circuit configured to generate an output corresponding to the sum of the output value of the negating circuit and a value received by at the second input;
   a selection circuit coupled to concurrently receive as input values the input coordinate and the signed coordinate output values of the plurality of coordinate calculation circuits, the selection circuit selecting one of the input values as an output texture coordinate value; and
   select logic coupled to the selection circuit and further coupled to receive input signals corresponding to the sign of the input coordinate value and the signs of the coordinate output values, the select logic providing a selection signal commanding the selection circuit to select one of the input values as the output texture coordinate in accordance with the received input signals.

4. The addressing circuit of claim 3 wherein the negate circuit comprises:
   an inverter having an input coupled to receive the signal corresponding to the sign of the input coordinate value and further having an output coupled to the summing circuit to provide a carry-in bit; and
   an exclusive OR (XOR) gate having a first input coupled to the output of the inverter and a second output coupled to receive the respective texture size value, the XOR gate further having an output coupled to the summing circuit.

5. The addressing circuit of claim 3 wherein the first and second coordinate calculation circuits receive the texture size values tex_size and 2*tex_size, respectively, where tex_size is the size of the texture map, and for the first and second coordinate calculation circuits, the second input of the summing circuits are coupled to receive the input coordinate value and the output of the summing circuits are coupled to provide a respective coordinate output value to the selection circuit, the select logic generating a selection signal to select the output texture coordinate as follows:
   if the sign of the input coordinate value is negative, and
      if the sign of the coordinate output value of the first coordinate calculation circuit is negative, select the output of the second coordinate calculation circuit as the output texture coordinate,
      otherwise select the output of the first coordinate calculation circuit as the output texture coordinate, and
   if the sign of the input coordinate is not negative, and
      if the sign of the coordinate output value of the first coordinate calculation circuit is negative, then select the input coordinate as the output texture coordinate, otherwise,
      if the sign of the coordinate output value of the second coordinate calculation circuit is negative, select the output of the first coordinate calculation circuit as the output texture coordinate,
      otherwise select the output of the second coordinate calculation circuit as the output texture coordinate.

6. The addressing circuit of claim 3 wherein the first and second coordinate calculation circuits receive the texture size values tex_size and 2*tex_size, respectively, where tex_size is the size of the texture map, and for the first and second coordinate calculation circuits, the second input of the summing circuits are coupled to receive the input coordinate value and the output of the summing circuits of the second coordinate calculation circuit is coupled to provide a coordinate output value to the selection circuit, the addressing circuit further comprising:
   a subtracting circuit having a first input coupled to the output of the summing circuit of the first coordinate calculation circuit and a second input coupled to receive the tex_size value, the subtracting circuit providing to the selection circuit at an output the difference of the output of the summing circuit of the first coordinate calculation circuit and the tex_size value.

7. The addressing circuit of claim 6 wherein the select logic generates a selection signal to select the output texture coordinate as follows:
   if the sign of the input coordinate value is negative, and
      if the sign of the coordinate output value of the first coordinate calculation circuit is negative, select the output of the second coordinate calculation circuit as the output texture coordinate,
      otherwise select the output of the subtracting circuit as the output texture coordinate, and if the sign of the input coordinate is not negative, and
if the sign of the coordinate output value of the first coordinate calculation circuit is negative, then select the input coordinate as the output texture coordinate, otherwise,
if the sign of the coordinate output value of the second coordinate calculation circuit is negative, select the output of the subtracting circuit as the output texture coordinate,
otherwise select the output of the second coordinate calculation circuit as the output texture coordinate.

8. The addressing circuit of claim 3 wherein the first and second coordinate calculation circuits receive the texture size values tex_size and 2*tex_size, respectively, where tex_size is the size of the texture map, and for the second coordinate calculation circuit the second input of the summing circuit is coupled to receive the input coordinate and the output of the summing circuit is coupled to provide a coordinate output value to the selection circuit, for the first coordinate calculation circuit the second input of the summing circuit is coupled to receive a 1LSB binary value having 1 as its least significant bit, the addressing circuit further comprising:
a subtracting circuit having a first input coupled to the output of the summing circuit of the first coordinate calculation circuit and a second input coupled to receive a null value, the subtracting circuit providing the difference of the sum value and the null value to the selection circuit.

9. The addressing circuit of claim 3 wherein the select logic generates a selection signal to select the output texture coordinate as follows:
if the sign of the coordinate output value of the second coordinate calculation circuit is negative, select the output of the subtracting circuit as the output texture coordinate,
otherwise select the input coordinate as the output texture coordinate.

10. The addressing circuit of claim 3 having a clamping mode and wherein the second coordinate calculation circuit of the plurality receives the texture size value 2*tex_size, where tex_size is the size of the texture map, and the second input of the summing circuit of the second coordinate calculation circuit is coupled to receive the input coordinate value and the output of the summing circuit of the second coordinate calculation circuit is coupled to the selection circuit, and
the first coordinate calculation circuit of the plurality receives through a first multiplexer as the texture size value either tex_size or 2*tex_size, and the second input of the summing circuit of the first coordinate calculation circuit is coupled to receive through a second multiplexer either the input coordinate value or a 1LSB binary value having 1 as its least significant bit, the output of the summing circuit of the first coordinate calculation circuit is coupled to provide a coordinate output value to the selection circuit,
the addressing circuit further comprising a subtracting circuit having a first input coupled to the output of the summing circuit of the first coordinate calculation circuit and a second input coupled to receive through a third multiplexer either the tex_size value or a null value, the subtracting circuit providing to the selection circuit at an output the difference of the output of the summing circuit of the first coordinate calculation circuit and the value received by the second input, the first, second, and third multiplexers providing the respective signals in accordance with the clamping mode.

11. The addressing circuit of claim 10, further comprising a clamping circuit coupled to receive the output texture coordinate of the selection circuit when in the clamping mode and provide a clamped output texture coordinate.

12. A method of calculating a texture coordinate for a texture map having a size from an input texture coordinate value located in one of a plurality of predefined input ranges, comprising:
calculating a plurality of signed texture coordinate values corresponding to the plurality of predefined input coordinate ranges, where the sign of the input texture coordinate value is negative, calculating a first value A=[input+(1*tex_size)] and a second value B=[input+(2*tex_size)], and otherwise, calculating a first value A=[input−(1*tex_size)] and a second value B=[input−(2*tex_size)], and further calculating a third value C=(tex_size−A), input is the input texture coordinate value and tex_size is the size of the texture map,
concurrently receiving the plurality of signed texture coordinate values and the input texture coordinate value; and
selecting an output texture coordinate from the plurality of calculated texture coordinate values and the input texture coordinate value, where the sign of the input texture coordinate value is negative, selecting B when (A<0), otherwise selecting C as the corresponding texture coordinate, and where the input texture coordinate is equal to zero or the sign of the input texture coordinate is positive, selecting the input texture coordinate value when (A<0), selecting C when (B<0), and selecting B otherwise.

13. The method of claim 12 wherein calculating and selecting are repeated for each axis of the texture map.

14. A method of calculating a texture coordinate for a texture map having a size from an input texture coordinate value located in one of a plurality of predefined input ranges, comprising:
calculating a plurality of signed texture coordinate values corresponding to the plurality of predefined input coordinate ranges, where the sign of the input texture coordinate value is negative, calculating a first value A=[2*tex_size] and a second value B=[input+(2*tex_size)], and otherwise, calculating a first value A=[−2*tex_size+1LSB] and a second value B=[input−(2*tex_size)], and further calculating a third value C=(0−A), input is the input texture coordinate value, tex_size is the size of the texture map, and 1LSB is a binary value equal to 1 and having a bit length the same as the tex_size;
concurrently receiving the plurality of signed texture coordinate values and the input texture coordinate value; and
selecting an output texture coordinate from the plurality of calculated texture coordinate values and the input texture coordinate value, where the sign of the second value B is negative, selecting C as the output texture coordinate, and otherwise, selecting the input texture coordinate as the output texture coordinate; and
clamping the selected output texture coordinate to a clamped value.

15. The method of claim 14 wherein calculating and selecting are repeated for each axis of the texture map.

16. The method of claim 14 wherein clamping the selected output texture coordinate comprises clamping the output texture coordinate to an edge value along an edge of the texture map.

17. The method of claim 14 wherein clamping the selected output texture coordinate comprises clamping the output texture coordinate to a border value one texel beyond the texture map.

18. The method of claim 14 wherein clamping the selected output texture coordinate comprises clamping the output texture coordinate to a coordinate value half of a texel beyond an edge of the texture map.

* * * * *